Aug. 12, 1958     F. B. BERGER     2,847,666
RANGE GATED DOPPLER RADAR
Filed Dec. 8, 1953     3 Sheets-Sheet 1
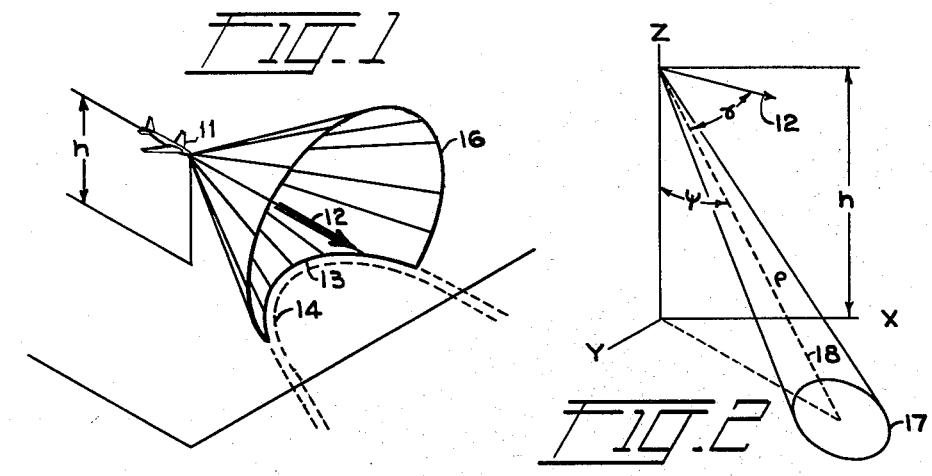
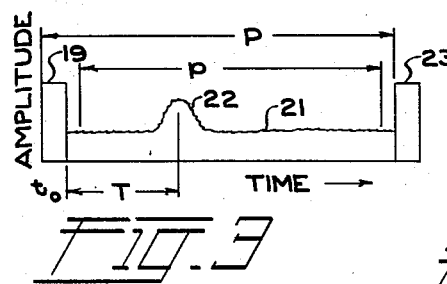
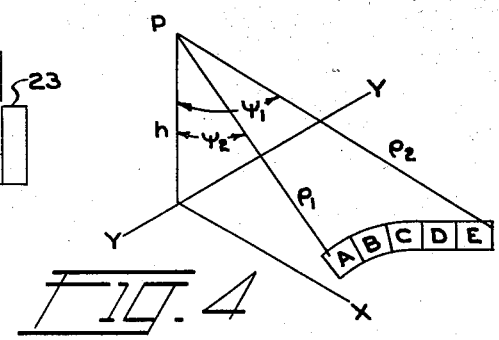
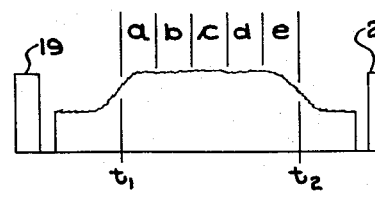
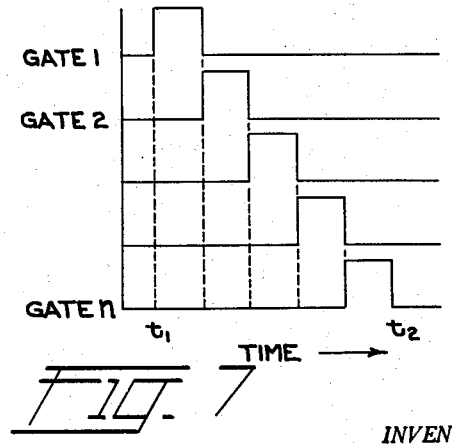
*INVENTOR.*
FRANCE B. BERGER
BY
ATTORNEY

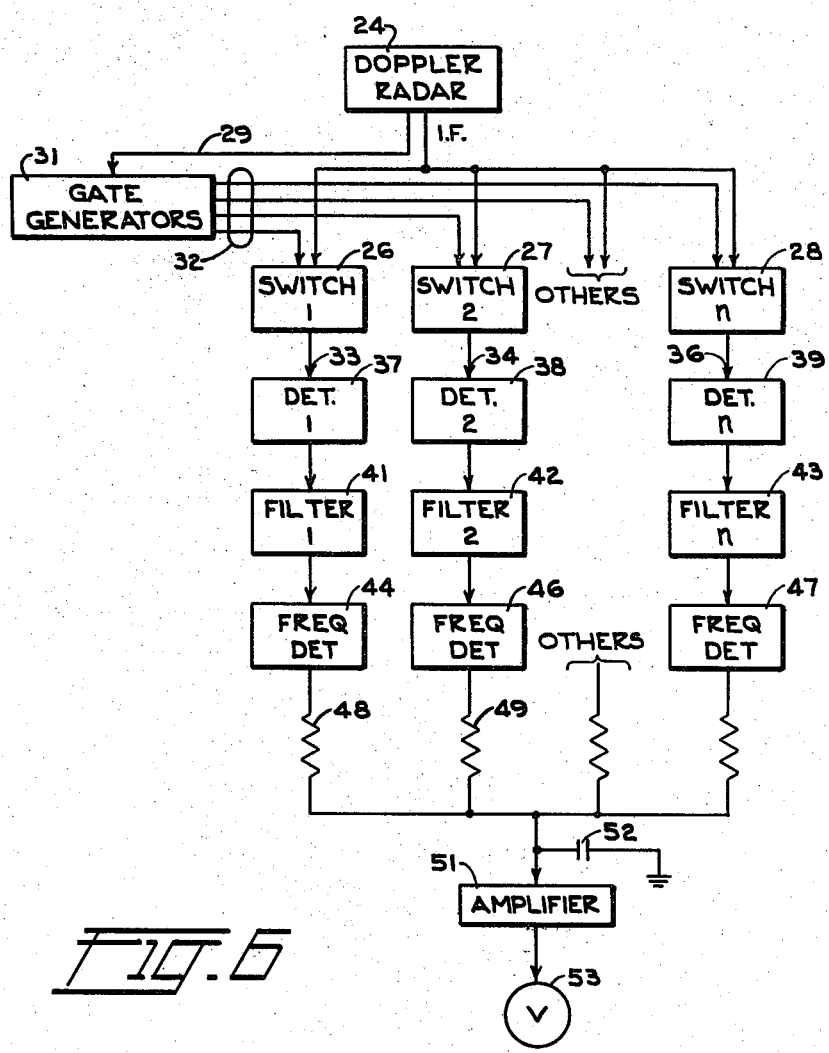

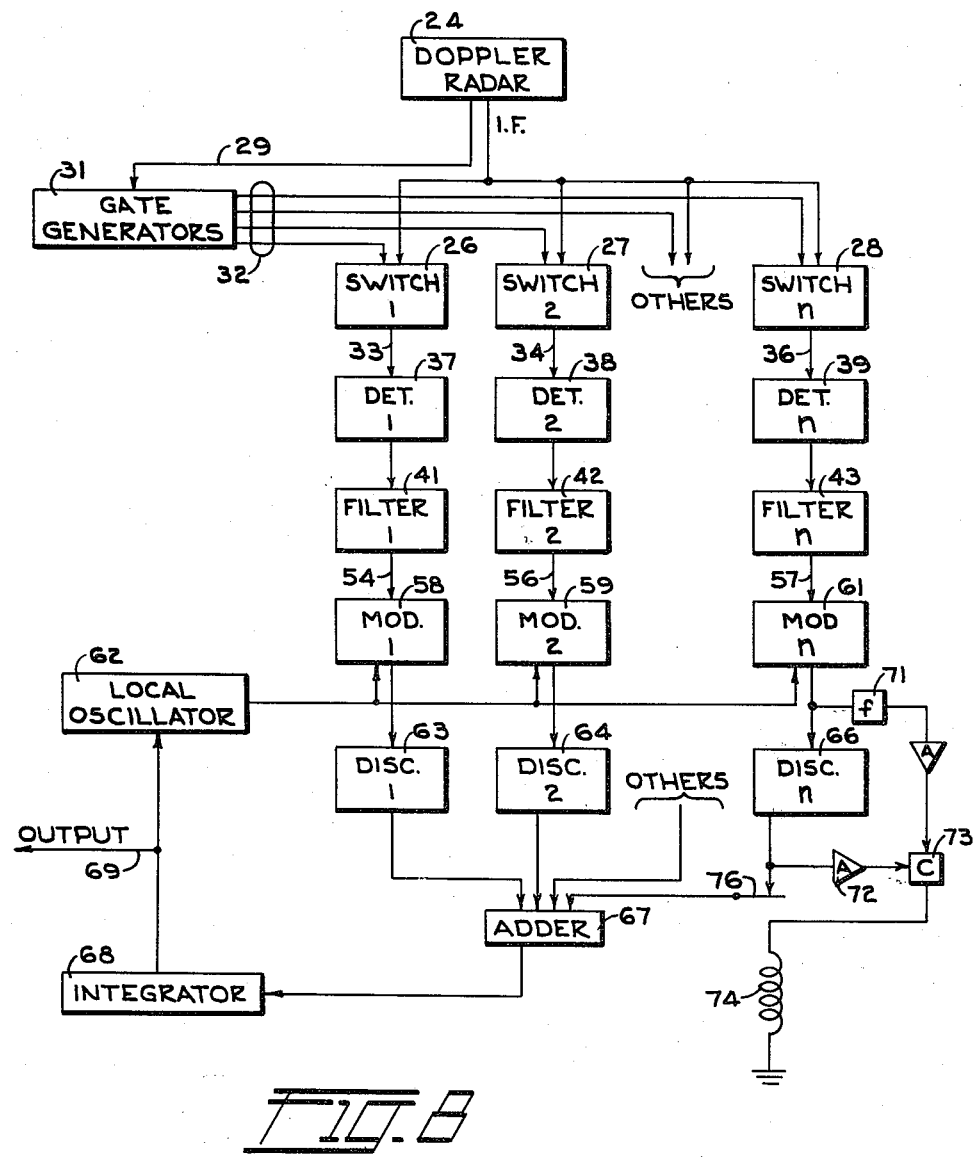

2,847,666
Patented Aug. 12, 1958

2,847,666

RANGE GATED DOPPLER RADAR

France B. Berger, Pleasantville, N. Y., assignor to General Precision Laboratory Incorporated, a corporation of New York Application December 8, 1953, Serial No. 396,803

12 Claims. (Cl. 343—8)

This invention relates to radio echo systems employing the Doppler phenomenon and especially relates to microwave radio systems utilizing range gating.

This invention is particularly applicable to airborne radar systems in which a microwave beam is directed from the aircraft toward the earth and the Doppler-shifted return is employed as a measure of the aircraft speed or drift. Such systems may employ a variety of beam forms, but this invention is particularly directed to systems employing beams having such form that the median frequency of the Doppler spectrum in the return signal is approximately the same in all parts of the beam.

When the microwave beam is directed against the earth so that it makes an acute angle therewith, and the beam covers an appreciable area of the earth, the paths by which the microwave energy reaches the earth and returns are of several different lengths and accordingly the travel times are different for energies in the several parts of the beam. The time of reception is then proportional to the range of the target in each element of the beam. This is true even though the beam may have such shape as to make the "looking angle," $\gamma$, the angle between the beam and the aircraft direction of travel, substantially the same in all parts of the beam.

The process of range gating is merely the process of segregating a portion of the returned signal by applying an electronic time gate to it, and by multiple range gating is meant the application of several time gates to the returned signal. In this invention multiple range gating is employed, and the range gates preferably consist of a continuous series of time gates opening successively arranged to fill most of the pulse repetition period, or of several such periods.

When microwave energy is reflected from the earth to form the return signal of a Doppler radar the reflection takes place from numerous small areas of the earth's surface which are completely independent in phase. The returned signal can be considered as a group of signals, each from an individual scatterer or reflecting area, each signal being randomly phased and independent of each other signal. Each short signal resulting from the range gating process can generally be considered as having been reflected from a separate scattering area of the earth, and hence as being statistically independent of each other short gated signal.

The signals received in the several time gates each contain Doppler information having a certain degree of inaccuracy because of the statistical nature of the reflecting action which also causes widening of the Doppler frequency spectrum. This degree of inaccuracy is in most cases comparable to that in the entire signal. However, if the several time-gated signals be demodulated and measurement made of the Doppler information contained in each, then if the average of the results be secured the resulting Doppler measurement has an error reduced by the factor $\sqrt{n}$, $n$ being the number of gates. A practical limit is set to the maximum size of $n$ by the fact that there is no advantage in making the gate substantially shorter than one pulse width.

An additional advantage of such a system lies in the possibility it offers of reducing the smoothing time of the instrumentation. Bearing in mind that the smoothing time required for adequate operation is normally an inverse function of the signal-to-noise $(S/N)$ ratio, it is seen that reduction of the smoothing time gives a result similar to increase of $S/N$. That is, application of this invention permits operation on signals of $S/N$ ratio which would be so low as to fail to operate the system otherwise.

One purpose of this invention is to provide a Doppler radar system for measuring aircraft speed or drift with improved accuracy.

Another purpose of this invention is to provide a Doppler radar system for measuring aircraft speed or drift when the $S/N$ ratio of the received signal is low.

A further understanding of this invention may be secured from the detailed description and the drawings, in which:

Figures 1, 2 and 4 depict geometry of microwave beams transmitted from aircraft.

Figures 3 and 5 are graphs of microwave amplitude as a function of time.

Figure 6 is a block diagram of one form of microwave Doppler frequency measuring system utilizing the invention.

Figure 7 illustrates the relative relation of the several time gates used.

Figure 8 is a block diagram of a modified form of microwave Doppler frequency measuring system utilizing the invention.

Fig. 1 illustrates the geometry of one form of airborne microwave radar beam which may be employed in a radio echo system for the determination of aircraft speed and for other purposes. The special characteristics and advantages of an antenna having such a beam (gain pattern) is described in copending applications, S. N. 49,926, filed September 18, 1948 and S. N. 249,472, filed October 3, 1951, both for a Course and Speed Indicating System in the name of France B. Berger et al., and owned by the assignee common with the present application. The present invention is particularly adapted to be used with a system including an antenna giving substantially the same narrow echo frequency spectrum characteristic in a mobile speed measuring system. The beam is in the form of a hollow cone projected from the aircraft 11 concentric with the aircraft direction of motion indicated by arrow 12, the upper half or more of the cone usually being cut off by reflecting surfaces at the antenna. The cone if ideally thin intersects the earth plane in an intersectional line 13 which, when direction 12 is horizontal or when the line of climb or dive makes an angle with the horizontal less than the "looking" angle, is an hyperbola. If the wall of the cone has some thickness as it always has in practice, the hyperbolic intersection is a zone indicated in the figure as having two edges 13 and 14.

Because the cone extends indefinitely the hyperbolic zone also extends indefinitely although in the illustration the cone has been terminated at the circle 16 to facilitate visualization. The angle between the wall of the cone and the axial direction 12 is called the "looking angle" and is termed $\gamma$. The aircraft altitude is termed $h$.

Referring to the general case of a radio echo system as shown in Fig. 2, in which the flight may have any direction 12, and in which the beam may have any cross-sectional form, being shown as a circle projected to form an elliptical intersection 17 with the earth. The aircraft at the point P is at an altitude $h$ above the earth plane defined by the X and Y axes, with the looking angle $\gamma$ to the central ray 18 of the beam as indicated. The angle $\psi$ is the angle between the vertical and the beam.

It is well understood that the frequency of Doppler information, $\nu$, in a Doppler radar beam projected in the direction of aircraft flight is given by $$\nu = \frac{2V}{\lambda} \qquad (1)$$

in which V is the aircraft velocity and $\lambda$ is the microwavelength. When the direction of the microwave beam is not coincident with the direction of flight but makes an angle $\gamma$ therewith, the formula is $$\nu = \frac{2V}{\lambda} \cos \gamma \qquad (2)$$

Therefore, considering the geometry of Fig. 1, the Doppler frequency information in the echoes returned from all parts of the hyperbolic zone, even from parts many miles distant, is all exactly the same with regard to the Doppler frequency secured from it except for small differences due to variation of $\gamma$ in the width of the zone. In the same way, in Fig. 2, information received from parts of the beam having the same $\gamma$ angle leads to the same Doppler frequency determination. In general, these parts however have various $\psi$ angles, the angle $\psi$ being the angle between the directions $h$ and $\rho$, the beam length or slant range.

The time relation between transmitted and received microwave energy is indicated in Fig. 3 for the general case of an airborne Doppler microwave pulse radar system illustrated in Fig. 2. Assume that at time $t_0$ a microwave pulse 19 is transmitted toward the earth. The pulses are regularly emitted at a pulse repetition frequency having a period P which for the purpose of speed measurement should be fairly short as, for example, 20 microseconds. If the receiver is gated for reception during the period $p$ between transmitting pulses, it will be subjected to noise reception for the full duration of this time as indicated by the low-level line 21. At some time T after the transmitting pulse an echo or reflected pulse, indicated generally at 22, is received. The abscissa T represents the time taken for the transmitted pulse to reach the target or reflecting area on the earth's surface plus the time taken for the echoed or reflected energy to return to the aircraft.

Since $$T = \frac{2\rho}{C} \qquad (3)$$

in which C represents the speed of electromagnetic energy in space, 186,284. statute miles per second, the time T in Fig. 3 is strictly proportional to the slant range $\rho$, Fig. 2. The maximum time $p$ in Fig. 3 of about 18 $\mu$'s therefore represents a maximum range of about 3.35 miles within which the received signal is received continuously. Signals received due to echoes of transmitted pulse 19 at times later than (to the right of) the next pulse 23 are also quite usable, and in this invention any or all parts of the returned signal may be employed to secure an improved speed measurement, but for the purposes of this specification the explanation is confined to the time interval $p$ between two successive transmitting pulses 19 and 23 during which the echo of pulse 19 is received.

Continuing with the analysis of the general case illustrated in Figs. 2 and 3, Fig. 4 represents the reception of reflected microwave energy by an aircraft at the position P from several successive areas A, B, C, D and E of the earth. These areas are at different slant ranges varying from $\rho_1$ to $\rho_2$, although as previously explained their $\gamma$ angles may or may not be the same and accordingly the Doppler frequency information received in these several return beams may or may not be the same. Let it be assumed that the several areas A to E lie along an hyperbola such as indicated in Fig. 1, so that the Doppler frequencies are all substantially the same. The linear difference between $\rho_1$ and $\rho_2$ depends on both the angle $\psi_1$, the difference between $\psi_1$ and $\psi_2$ and the altitude $h$.

Since the altitude $h$ is a factor, a sharply defined and short return signal such as indicated in Fig. 3 is possible only at low altitudes. At high altitudes the return from even a concentrated beam signal is spread out in time so that it often may fill the entire usable time between pulses as indicated by $p$ in Fig. 3.

When a received signal is spread out in time due to inclusion of echoes from elements of the earth's surface at different slant ranges, whatever the cause, the received signal may appear as indicated in Fig. 5, being spread between the times $t_1$ and $t_2$ so as nearly to fill the time between two transmitted pulses 19 and 23. Let it be assumed that the return signal comes from the ground trace of Fig. 4, so that the signals received at different times are identified as signals $a$, $b$, $c$, $d$ and $e$ received from the ground elements A, B, C, D and E respectively. The Doppler information in the entire signal between $t_1$ and $t_2$ has a certain statistical fluctuation so that the probable error of the resulting Doppler frequency indication has a certain value. Now, assuming the elements $a$, $b$, $c$, $d$ and $e$ are equal in length and each is slightly longer than a transmitting pulse, each will have the same relative uncertainty in frequency as the complete signal, and because they emanate from separate earth scatterers, these returns will be randomly phased and will result in statistically independent measurements of the Doppler frequency. A measurement secured by using the Doppler information in a single one of these elements will therefore have the same probable error as that secured in a single measurement of the complete signal. It is then possible to make a plurality of independent measurements of the Doppler frequency, one for each of the five elements $a$, $b$, $c$, $d$ and $e$ shown as examples and by averaging these measurements to secure an average value of probable error that is less by a factor of $\sqrt{5}$ than the probable error of any single measurement. That is, the error of the average is 0.447 of the probable error in measuring the complete signal as a unit.

This conclusion indicates a method of improving Doppler radar measurements of frequency that is particularly effective at high altitudes where other methods of improvement are not available.

One means for making such an improved measurement in accordance with the present invention is indicated in Fig. 6. A Doppler radar 24 delivers a composite intermediate frequency received signal such as the entire signal between times $t_1$ and $t_2$, Fig. 5, to a series of $n$ gate switches 26, 27, 28. If the signal is to be divided into five parts as indicated in Fig. 5, $n$ equals 5. A timing signal representing the transmitted pulse is applied through conductor 29 to initiate the operation of a series of gate generators 31 which generate a series of $n$ consecutive equal gate signals, each being slightly greater than the duration of one transmitting pulse. These signals are applied through conductors 32 from one of the generators 31 to a respective switch, and cause each switch to open for the duration of one of the gate signals. The switches thus become conductive successively, as indicated in Fig. 7, gate 1 being the conductive period of switch 1, gate 2 of switch 2, etc. In each of the output conductors 33, 34 and 36, there then exists for the duration of its gate one of the signal fractions marked $a$, $b$, etc. in Fig. 5.

The output conductors 33, 34 and 36 are connected to detectors 37, 38, 39, respectively, where the intermediate frequency signal is demodulated and the video signals containing Doppler information are passed through filters 41, 42 and 43, to remove the pulse repetition frequency and higher frequencies. The filter outputs contain electrical energy having frequencies representing the Doppler frequency spectrum and noise. These signals are applied to frequency detectors and determiners 44, 46 and 47 which may have any of a large variety of forms, but which are preferably measuring devices having direct-current or in-phase, 400 C. P. S. output potentials, each representing by its magnitude the median frequency of the Doppler frequency spectrum applied to it. A simple form of frequency determining device is that of the frequency discriminator employed in the detection of frequency-modulated communication signals, and described in standard textbooks.

The outputs of frequency detectors 44, 46 and 47, being voltages proportional to Doppler frequency and each having an uncertainty or inherent probable error, are averaged by application to a summing device which may, for example, be the resistors 48, 49, etc. These resistors are paralleled to the input of an amplifier 51 and to an integrating capacitance 52. The amplifier output is applied to a voltmeter 53 the reading of which represents the statistical average of the outputs of the several frequency devices and therefore the average output error is less than that of any single output taken alone by the factor $\sqrt{n}$.

An extension of the instrumentation of Fig. 6 leads to an additional improvement. The open loop frequency measuring devices of Fig. 6, such as device 44, have the inherent ability to measure input signals having $S/N$ ratio greater than a certain minimum value and the smoothing effect and time constant of the combination of condenser 52 and the adding resistors are invariable and not dependent upon the input signal. When, however, a closed loop tracking and heterodyning frequency determining means is employed, the smoothing time is dependent on the input $S/N$ ratio and, conversely, if a faster integrating operation be effected the effect of an improved input $S/N$ ratio is secured, that is, the circuit will operate with a lowered minimum $S/N$ ratio.

In order to improve the $S/N$ ratio characteristic and at the same time be able to follow automatically the rates of change of the Doppler frequencies associated with actual flying conditions, it is necessary to modify the instrumentation of Fig. 6 to provide a closed loop frequency determining means so that the frequency of a local oscillator common to all the channels will be made to follow the Doppler frequency. Such a modification is shown in Fig. 8. The radar and intermediate frequency components are the same as in Fig. 6 and supply, at the outputs 54, 56 and 57 of the filters 41, 42 and 43, time gated signals containing the Doppler frequencies. Each median Doppler frequency is subject to an uncertainty or probable error, as before described, because of the statistical nature of the signal so that, in order to secure a prescribed accuracy, a certain smoothing or integrating time constant is required.

The filter outputs are applied to modulators 58, 59 and 61 which are also supplied with a heterodyning signal from a local oscillator 62. If, for example, the Doppler median frequency is 2500 C. P. S., and the local oscillator generates a signal having a frequency of 22,500 C. P. S., one of the resultant frequencies is the difference frequency, namely, 20,000 C. P. S. The modulator outputs are applied to discriminators 63, 64 and 66 which are tuned to the difference frequency, in this case all being tuned to 20,000 C. P. S. The outputs of the discriminators will then be zero at 20,000 C. P. S., but will depart from this magnitude by amounts representing the various channel errors. Their outputs having magnitudes representing these errors are averaged by application to an adding device 67.

The output of adding device 67, in the absence of other components, would be similar in accuracy and $S/N$ threshhold to the output of the circuit of Fig. 6 except for the essential element of integration. This integration is supplied in Fig. 8 by an integrator 68 applied after adder 67, and in operation in an open loop its output would be no better and no worse than the output of the circuit of Fig. 6. When used in the closed loop, however, the integrator output represents the closed loop input signal smoothed during a time period which equals the loop time constant. The integrator output is employed to control the closed loop oscillator 62 and in addition constitutes the output of the system as indicated by conductor 69.

The oscillator 62 is of a type which is controllable in frequency by means of an input voltage. For exmaple, if the integrator output is a direct voltage representing by its amplitude the Doppler frequency which is to be determined, and if the oscillator 62 is sensitive to changes in fixed bias, the integrator output voltage can be applied as bias to the oscillator 62 in such sense as to cause it to track the Doppler frequency changes. If, for example, the Doppler frequency should become less than 2500 C. P. S., the discriminator output would change in such sense as to reduce the integrator output voltage, reducing the oscillator frequency by the right amount to restore the frequency of the discriminator input signal to 20,000 C. P. S.

The ability of a closed loop frequency determining means or frequency tracker to track signals which vary in frequency and the accuracy with which it tracks them both depend on two external factors. These factors are the $S/N$ ratio of the input signal and the rate at which the signal changes in frequency. An internal factor is the loop time constant. These factors are so related that if the loop time constant be increased, the accuracy with which the loop follows signals is increased but the ability to follow rapid changes is decreased, and vice versa. When a frequency tracker is employed in the apparatus of this invention its tracking properties are enhanced. That is, the frequency tracker loop having a selected time constant provides improved tracking accuracy, or a loop having selected accuracy can be made with a shorter time constant for tracking of input signals which are varying more rapidly in frequency; with a compromise value of time constant a moderate improvement in both accuracy and tracking is secured. The effect is somewhat as if the input signal had a higher $S/N$ ratio.

The output signal in conductor 69, being proportional to the Doppler frequency, may be utilized for Doppler frequency indication as in Fig. 6, for the direct indication of aircraft speed or drift, or may be utilized as an input representing such a quantity to a computer.

Recapitulating, the employment of time gating of the received signal as in Fig. 6 provides Doppler frequency determination of improved accuracy, and substitution of the closed loop frequency indication system of Fig. 8 also provides improved accuracy of frequency determination and in addition permits operation on input signals of lower $S/N$ ratio than is otherwise possible. The modification of Fig. 8 also automatically tracks the Doppler frequency to adapt it to actual flying conditions.

The apparatus of this invention may be employed as the basis of an altitude measuring device in addition to its previously described functions. As mentioned before, the received signal is extended in time, as in the abscissae of Fig. 5, in proportion to the altitude of the aircraft. The early part of the signal, such as the portion $a$, occurs at a time later than the transmitted signal 19 which is strictly proportional to altitude. Therefore the delay time of the first gate signal can be employed as an indication of altitude.

In the general case equal signal energy is not contained in all of the gate intervals. The early gates are likely to contain more energy than the later ones. Since the $S/N$ ratios of all of the gated signals have an effect upon the final result, it is advantageous to eliminate all gated signals having a greater proportion of noise to signal than a selected amount, and retain the remainder to be summed.

One way in which this can be done is indicated in Fig. 8 on channel $n$. A filter 71 having a pass frequency several hundred cycles per second removed from the tuned frequency of the discriminator 66 is connected to the discriminator input, thus receiving only the noise signal. An amplifier 72 is connected to the output of discriminator 66, thus receiving both noise and Doppler signal. The output of amplifier 72 is compared with the amplified output of filter 71 in a comparator 73, and the comparator output is made to operate a relay coil 74 when the $S/N$ ratio drops below a selected value. Operation of the relay opens its contact 76, disconnecting the channel from adder 67. Upon increase of the S/N ratio the reverse operation restores the channel connection. Similar S/N relays can be installed in all channels.

What is claimed is:

1. A radio echo system for determining the Doppler frequency of pulse echo signals the time duration of which is in excess of the duration of the transmitted pulse signals which give rise thereto comprising, a plurality of separate similar channels having said received echo signals impressed thereon, means for sequentially rendering said channels conductive during limited time intervals, means in each of said channels for producing an electrical quantity the magnitude of which is representative of the Doppler frequency of the signal transmitted therethrough, and means for averaging the electrical quantities produced by each of the several channels.

2. A radio echo system for determining the Doppler frequency of pulse echo signals the time duration of which is in excess of the duration of the transmitted pulse signals which give rise thereto comprising, a plurality of separate similar channels having said received echo signals impressed thereon, normally non-conductive switch means in each of said channels, means connected to said switch means for rendering each of said switch means conductive during separate limited intervals of time, means in each of said channels for producing an electrical quantity the magnitude of which is representative of the Doppler frequency of the signal transmitted thereby, and means for averaging the electrical quantities produced by each of the several channels.

3. A radio echo system for determining the Doppler frequency of pulse echo signals the time duration of which is in excess of the duration of transmitted pulse signals which give rise thereto comprising, means for receiving said echo signals, a plurality of separate similar channels having said echo signals impressed thereon, each of said channels including a gate circuit, means for generating a plurality of successive gate signals of preselected duration, means for sequentially applying separate ones of said gate signals to respective gate circuits of said plurality of channels whereby the received echo signals are transmitted through respective channels during limited intervals of time, means in each of said channels for producing an electrical quantity whose magnitude is representative of the Doppler frequency of the signal transmitted therethrough, and means for averaging the electrical quantities produced in each of the several channels.

4. A radio echo system for determining the Doppler frequency of pulse echo signals produced by the reflection of transmitted pulse signals over different path lengths comprising, means for receiving said echo signals, a plurality of separate signal channels connected in parallel to said receiving means, each of said signal channels including a normally non-conductive electronic switch circuit a demodulator and a filter for demodulating and segregating a Doppler frequency signal from the signal transmitted therethrough, means for generating a plurality of successive gate signals equal in number to the number of separate channels, means for rendering separate ones of said electronic switch circuits conductive by separate ones of said gate signals whereby limited time increments of said pulse echo signals are sequentially transmitted through the several channels, means in each of said channels for producing from the Doppler frequency signal existing therein a potential whose magnitude is representative of the particular frequency of the Doppler signal in said channel, and means for obtaining the average magnitude of the potentials produced in each channel.

5. A radio echo system for determining the Doppler frequency of pulse echo signals produced by the reflection of transmitted pulse signals over different path lengths so that the received pulse echo signals endure for a period of time in excess of the time duration of the transmitted pulse signals which give rise thereto comprising, a plurality of separate transmission channels having said pulse echo signals impressed therein, a normally non-conductive electronic switch circuit in each of said channels, a gate generator producing a continuous series of equal gate signals, means interconnecting said gate generator and the several switch circuits of said separate channels for actuating each switch circuit to its conductive condition by said gate signals, each switch circuit being actuated by a different one of said series of gate signals, means in each of said channels for producing a Doppler frequency signal from the portion of the received signal transmitted therethrough, means in each of said channels for producing a potential the magnitude of which is proportional to the particular frequency of the Doppler signal in any individual channel, and means for obtaining the average magnitude of the potentials in all of said channels.

6. A radio echo system for determining the Doppler frequency of pulse echo signals produced by the reflection of transmitted pulse signals over different path lengths so that the received pulse echo signals endure for a period of time in excess of the time duration of the transmitted pulse signals which give rise thereto comprising, a plurality of separate transmssion channels having said pulse echo signals impressed thereon, a normally non-conductive electronic switch circuit in each of said channels, a gate generator producing a continuous series of equal gate signals, means interconnecting said gate generator and the several switch circuits of said separate channels for acutating each switch circuit to its conductive condition by said gate signals, each switch circuit being actuated by a different one of said series of gate signals, a detector in each of said channels for deriving a Doppler frequency signal from the portion of the received signal transmitted through the particular channel, a frequency discriminator in each of said channels energized by the Doppler frequency signal existing in any particular channel, and a single averaging means energized by the outputs of all of said frequency discriminators.

7. A radio echo system for determining the Doppler frequency of pulse echo signals produced by the reflection of transmitted pulse signals over different path lengths so that the received pulse echo signals endure for a period of time in excess of the time duration of the transmitted pulse signals which give rise thereto comprising, a plurality of separate transmission channels having said pulse echo signals impressed thereon, a normally non-ductive electronic switch circuit in each of said channels, a gate generator producing a continuous series of equal gate signals, means interconnecting said gate generator and the several switch circuits of the separate channels for actuating separate ones of said switch circuits to their conductive condition by separate ones of said gate signals, frequency tracker means including a single local oscillator and means located in each of said channels for producing from the output of said local oscillator and that portion of the signal transmitted through the particular channel potential the amplitudes of which are representative of the departure of the signal output of that channel from a selected frequency, means for averaging the potentials produced by the several separate channels and means for controlling the frequency of said local oscillator in accordance with the average potential taken over a period of time.

8. A radio echo system as set forth in claim 7 in which at least one of said channels is provided with means for disconnecting such channel from the means for averaging the potentials when the signal to noise ratio of the signal transmitted by that channel falls below a predetermined level.

9. A radio echo system for determining the Doppler frequency of pulse echo signals produced by the reflection of transmitted pulse signals over different path lengths so that the received pulse echo signals endure for a period of time in excess of the time duration of the transmitted pulse signals which give rise thereto comprising, a plurality of separate transmission channels having said pulse echo signals impressed thereon, a normally non-conductive electronic switch circuit in each of said channels, a gate generator producing a continuous series of equal gate signals, means interconnecting said gate generator and the several switch circuits of the separate channels for actuating separate ones of said switch circuits to their conductive condition by separate ones of said gate signals, a modulator in each of said channels, means in each of said channels for converting the output of the modulator in any particular channel into a potential the magnitude of which is proportional to the frequency of that modulator output, averaging means for averaging the several potentials so produced by said plurality of channels, a single local oscillator, means for controlling the frequency of said local oscillator by the time average output of said averaging means, and means for impressing the output of said local oscillator on each of the several modulators of said plurality of channels.

10. A radio echo system as set forth in claim 9 in which at least one of said channels is provided with means for disconnecting such channel from the averaging means when the signal to noise ratio of the signal transmitted by that channel falls below a predetermined level.

11. A radio echo system for determing the Doppler frequency of pulse echo signals produced by the reflection of transmitted pulse signals over different path lengths so that the received pulse echo signals endure for a period of time in excess of the time duration of the transmitted pulse signals which give rise thereto comprising, a plurality of separate transmission channels having said pulse echo signals impressed thereon, a normally non-conductive electronic switch circuit in each of said channels, a gate generator producing a continuous series of equal gate signals, means interconnecting said gate generator and the several switch circuits of the separate channels for actuating separate ones of said switch circuits to their conductive condition by separate ones of said gate signals, means in each of said channels for converting that portion of the received signal existing therein to a Doppler frequency signal, a modulator for each of said channels having the Doppler frequency signal existing in its associated channel impressed thereon, a single local oscillator having its output impressed on each of the modulators whereby each modulator output signal has a selected frequency, a discriminator for each of said channels having the output signal of its associated modulator impressed thereon and producing therefrom a potential in each channel the amplitude of which is representative of the departure of the modulator output from a selected frequency, averaging means having the potentials of each channel impressed thereon and producing therefrom an average potential, means for integrating said average potential, and means for controlling the frequency of said local oscillator in accordance with said integrated average potential.

12. A radio echo system as set forth in claim 11 in which at least one of said channels is provided with means for disconnecting the output of the discriminator of that channel from said averaging means when the signal to noise ratio of the signal transmitted in that channel falls below a predetermined level.

References Cited in the file of this patent

UNITED STATES PATENTS

| | | |
|---|---|---|
| 2,422,064 | Anderson et al. | June 10, 1947 |
| 2,541,066 | Jaynes | Feb. 13, 1951 |
| 2,600,193 | Bell et al. | June 10, 1952 |
| 2,617,093 | Tyler | Nov. 4, 1952 |
| 2,669,710 | Sherr | Feb. 16, 1954 |

FOREIGN PATENTS

| | | |
|---|---|---|
| 601,125 | Great Britain | Apr. 28, 1948 |